United States Patent
Lind et al.

(10) Patent No.: US 7,630,916 B2
(45) Date of Patent: Dec. 8, 2009

(54) SYSTEMS AND METHODS FOR IMPROVING COLLABORATIVE FILTERING

(75) Inventors: Jesper B. Lind, Seattle, WA (US); Carl M. Kadie, Bellevue, WA (US); Christopher A. Meek, Kirkland, WA (US); David E. Heckerman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1354 days.

(21) Appl. No.: 10/603,541

(22) Filed: Jun. 25, 2003

(65) Prior Publication Data

US 2004/0267596 A1  Dec. 30, 2004

(51) Int. Cl.
  *G06F 17/30* (2006.01)
(52) U.S. Cl. .................................. 705/10; 707/3; 707/5
(58) Field of Classification Search ........................ None
  See application file for complete search history.

(56) References Cited

U.S. PATENT DOCUMENTS

| | | | |
|---|---|---|---|
| 5,704,017 A | 12/1997 | Heckerman et al. | |
| 6,006,218 A | 12/1999 | Breese et al. | |
| 6,018,738 A | 1/2000 | Breese et al. | |
| 6,134,532 A * | 10/2000 | Lazarus et al. | 705/14 |
| 6,144,964 A | 11/2000 | Breese et al. | |
| 6,154,736 A | 11/2000 | Chickering et al. | |
| 6,266,649 B1 * | 7/2001 | Linden et al. | 705/26 |
| 6,345,264 B1 | 2/2002 | Breese et al. | |
| 6,353,813 B1 | 3/2002 | Breese et al. | |
| 6,513,026 B1 | 1/2003 | Horvitz et al. | |
| 6,587,835 B1 * | 7/2003 | Treyz et al. | 705/14 |
| 6,601,012 B1 | 7/2003 | Horvitz et al. | |
| 6,636,836 B1 * | 10/2003 | Pyo | 705/26 |
| 6,801,909 B2 * | 10/2004 | Delgado et al. | 707/4 |
| 6,831,663 B2 * | 12/2004 | Chickering et al. | 715/700 |
| 6,865,565 B2 * | 3/2005 | Rainsberger et al. | 706/47 |
| 7,113,917 B2 * | 9/2006 | Jacobi et al. | 705/14 |
| 7,158,961 B1 * | 1/2007 | Charikar | 707/2 |
| 7,162,487 B2 * | 1/2007 | Kindo et al. | 707/102 |
| 7,194,477 B1 * | 3/2007 | Bradley et al. | 707/102 |

(Continued)

OTHER PUBLICATIONS

Linden, G.; Smith, B.; York, J., "Amazon.com recommendations: item-to-item collaborative filtering," Internet Computing, IEEE, vol. 7, No. 1, pp. 76-80, Jan./Feb. 2003.*

(Continued)

*Primary Examiner*—Albert DeCady
*Assistant Examiner*—Dave Robertson
(74) *Attorney, Agent, or Firm*—Lee & Hayes, PLLC

(57) ABSTRACT

The present invention provides collaborative filtering systems and methods employing statistical smoothing to provide quickly creatable models that can efficiently predict probability that a user likes an item and/or similarities between items. Smoothing is accomplished by utilizing statistical methods such as support cutoff, single and multiple prior on counts, and prior on measure of association and the like. By improving model-based collaborative filtering with such techniques, performance is increased with regard to product-to-product recommendations. The present invention also provides improvements over systems based on dependency nets (DN) in both areas of quality of recommendations and speed of model creation. It can also be complementary to DN to improve the value of an existing collaborative filtering system's overall efficiency. It is also employable with low frequency user preference data.

155 Claims, 11 Drawing Sheets

U.S. PATENT DOCUMENTS

| | | | | |
|---|---|---|---|---|
| 7,428,500 | B1* | 9/2008 | Linden | 705/26 |
| 2003/0145002 | A1* | 7/2003 | Kleinberger et al. | 707/5 |
| 2004/0054572 | A1* | 3/2004 | Oldale et al. | 705/10 |
| 2004/0176966 | A1* | 9/2004 | Chen | 705/1 |
| 2008/0015953 | A1* | 1/2008 | Harper et al. | 705/27 |
| 2008/0114756 | A1* | 5/2008 | Konig et al. | 707/5 |

OTHER PUBLICATIONS

Linden, G., Smith, B., and York, J. 2003. Amazon.com Recommendations: Item-to-Item Collaborative Filtering. IEEE Internet Computing 7, 1 (Jan. 2003), 76-80.*

Karypis, G. 2001. Evaluation of Item-Based Top-N Recommendation Algorithms. In Proceedings of the Tenth international Conference on information and Knowledge Management (Atlanta, Georgia, USA, Oct. 5-10, 2001). H. Paques, L. Liu, and D. Grossman, Eds. CIKM '01. ACM, New York, NY, 247-254.*

Sarwar, B., Karypis, G., Konstan, J., and Riedl, J. 2000. Analysis of recommendation algorithms for e-commerce. In Proceedings of the 2nd ACM Conference on Electronic Commerce (Minneapolis, Minnesota, United States, Oct. 17-20, 2000). EC '00. ACM, New York, NY, 158-167.*

E. Vozalis and K. G. Margaritis. Analysis of recommender systems' algorithms. In Proceedings of the 6th Hellenic European Conference on Computer Mathematics and its Applications (HERCMA-2003), Athens, Greece, 2003.*

Alan Agresti, Categorical Data Analysis, 2002, 734 pages, John Wiley & Sons, Inc., Publication, New York.

Jean Dickinson Gibbons, Nonparametric Measures of Association, 1993, 97 pages, Sage Publications, Newbury Park, CA.

David Heckerman, David Maxwell Chickering, Christopher Meek, Robert Rounthwaite and Carl Kadie, Dependency Networks for Inference, Collaborative Filtering, and Data Visiualization, Journal of Machine Learning Research, 2000, pp. 49-75.

James T. McClave and Frank H. Dietrich, II, Statistics, 1988, 1014 pages, Dellen Publishing Company, San Francisco, CA.

Paul Resnick, Neophytos Iacovou, Mitesh Suchak, Peter Bergstrom, and John Riedl, GroupLens: An Open Architecture for Collaborative Filtering of Netnews, Proceedings of ACM 1994 Conference on Computer Supported Cooperative Work, 1994, pp. 175-186, ACM, Chapel Hill, NC.

H.T. Reynolds, Analysis of Nominal Data, 1984, 85 pages, Sage Publications, Newbury Park, CA.

Badrul Sarwar, George Karypis, Joseph Konstan, and John Riedl, Item-based Collaborative Filtering Recommendation Algorithms, Proceedings of the Tenth International World Wide Web Conference, 2001, pp. 285-295.

Brendan Kitts, David Freed and Martin Vrieze, Cross-sell: A Fast Promotion-Tunable Customer-item Recommendation Method Based on Conditionally Independent Probabilities, 2000, 10 pgs.

Carl M. Cadie, Christopher Meeks, and David Heckerman, "CFW: A Collaborative Filtering System Using Posteriors Over Weights of Evidence", 2002, 9 pgs.

John S. Breese, David Heckerman and Carl Cadie, "Empirical Analysis Algorithms for Collaborative Filtering", May 1998, 28 pgs.

* cited by examiner

SYSTEMS AND METHODS FOR IMPROVING COLLABORATIVE FILTERING

TECHNICAL FIELD

The present invention relates generally to data analysis, and more particularly to systems and methods for improving collaborative filtering.

BACKGROUND OF THE INVENTION

The use of data analysis tools has increased dramatically as society has become more dependent on digital information storage. In e-commerce and other Internet and non-Internet applications, databases are generated and maintained that have astronomically large amounts of information. Such information is typically analyzed, or "mined," to learn additional information regarding customers, users, products, etc. This information allows businesses and other users to better implement their products and/or ideas.

Electronic commerce has pervaded almost every conceivable type of business. People have come to expect that their favorite stores not only have brick and mortar business locations, but that they can also be accessed "online," typically via the Internet's World Wide Web. The Web allows customers to view graphical representations of a business' store and products. Ease of use from the home and convenient purchasing methods, typically lead to increased sales. Buyers enjoy the freedom of being able to comparison shop without spending time and money to drive from store to store.

Online commerce has continuously developed to bring a more enjoyable buying experience to online buyers. Often, websites require a "log in" and/or utilize a "cookie" to track which buyer is looking at their website. With this information, a business can track purchase parameters such as type, size, quantity, and purchasing frequency. This is valuable information because it allows a company to forecast future sales and to determine what goods are of the most interest to online buyers. Typically, however, people are individual in nature and each person tends to have slightly different likes and dislikes. For example, a company who sells a lot of cellophane tape online might assume that their buyers are utilizing it for craft project building purposes. Since the company also sells colored glitter, they may include an advertisement for glitter next to their tape advertisement on their website. In actuality, however, most of the customers are purchasing the tape for business office use, and the glitter advertisement may even turn some customers away due to the fact that the company seems to not understand its customer's needs correctly. The glitter advertisement could then even lead to decreased tape sales. Had the company, instead, offered staples and/or paper clips along with the tape, they might have seen increased sales for all of their products as buyers might now perceive their store as a "one-stop shop" for all of their business office supply needs.

Pairing up items for selling is often known as "associative selling." An effort is made to correlate various items/products based upon a particular buyer's past buying habits and/or the past buying habits of other buyers who purchased similar items in the past. This associative process can also be expanded beyond direct product sales. It can be utilized indirectly to enhance sales such as with television viewing habits. A television company can predict that most viewers of show X are men who prefer rugged sports such as football, extreme mountaineering, and rugby. This would give the television company a good idea that programming an opera or ballet in this time slot would probably reduce their viewer ratings. Even the existing show could be "enhanced" with more rugged content to increase the size of show X's audience. A successful show with a large audience naturally draws advertisers who want to reach more of their market. Thus, the viewing habits can even be used to provide appropriate commercials that have a high audience acceptance rate for a particular genre of viewers.

Prior to the advent of online selling, a salesperson would typically approach a customer and ask them a series of questions to better understand their likes and dislikes along with their prior purchasing habits. Through this interaction, the salesperson is able to determine suggestions for products this particular customer might like. This same type of "associative selling" is also just as important to online merchants. However, online there is not a salesperson to "size up" a customer and determine their needs and wants. Instead, programs are utilized to determine suggestions for online buyers when they visit a business' website. For example, consider an online buyer who previously bought a dog bowl and a dog bone. Probabilities can be determined that show that it is likely that this person owns a dog. The person might, therefore, be interested in dog related items such as dog collars, leashes, and brushes. Since these items are brought to the attention of the buyer, if it matches their needs, they are more likely to purchase those items than, for instance, an advertisement for catnip or a bird feeder.

Although associative type selling is extremely advantageous, it is also generally very difficult to actually determine product associations. This is generally due to complex computing requirements, difficulty in accessing and retrieving the necessary information, and/or long computational calculation times. If a method is inaccurate, it can possibly drive customers away, causing losses in sales. A man who bought his wife a toaster oven and pajamas for her birthday does not necessarily want to be constantly bombarded with hair curler and beauty aid advertisements. Just like with a good salesperson, correctly associated products can lead to increased sales, while, like a bad salesperson, incorrectly associated products may cause a decrease in sales. Therefore, it is important to have an accurate means to associate various products/items for diverse individuals. This includes those with esoteric tastes who visit a website only once in a great while, along with those who have more traditional tastes and buy frequently from the same website.

Techniques that attempt to determine preferences of a user are known as collaborative filtering. A collaborative filtering system can produce recommendations by determining similarities between one user and other users. The value of this type of information to society increases daily as we move towards an electronic oriented environment where our preferences can be easily disseminated to us by any number of means such as computers, televisions, satellite radios, and other devices that lend themselves to the potential of having interactivity with a user.

SUMMARY OF THE INVENTION

The following presents a simplified summary of the invention in order to provide a basic understanding of some aspects of the invention. This summary is not an extensive overview of the invention. It is not intended to identify key/critical elements of the invention nor to delineate the scope of the invention. Its sole purpose is to present some concepts of the invention in a simplified form as a prelude to the more detailed description that is presented later.

The present invention relates generally to data analysis, and more particularly to systems and methods for improving collaborative filtering (CF) such as memory and/or model based CF and the like. Statistical smoothing methods are leveraged to quickly create models that can efficiently predict the probability that a user likes an item and/or similarities between items. By improving collaborative filtering, dramatic increases in performance are obtainable in product-to-product recommendations. This facilitates in simplifying user interfaces and increasing user satisfaction with products/systems that employ the present invention. The present invention also provides improvements over systems based on dependency nets (DN) in both areas of quality of recommendations and speed of model creation. It can also be complementary to DN to improve the value of an existing collaborative filtering system's overall efficiency.

The present invention also facilitates data analysis by providing a means to create a collaborative filtering system that is computationally efficient and utilizes a minimal amount of memory. This allows a CF system to reside within devices that have low computational power and small memories. Servers will benefit from being able to readily provide recommendations quickly and more accurately while television set-top boxes with minimal memory will be able to likewise make recommendations that were previously restricted due to computational and memory requirements. This flexibility drastically increases the usefulness of collaborative filtering and allows more users to integrate CF into their businesses and also products, bringing a more user-friendly experience for customers.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
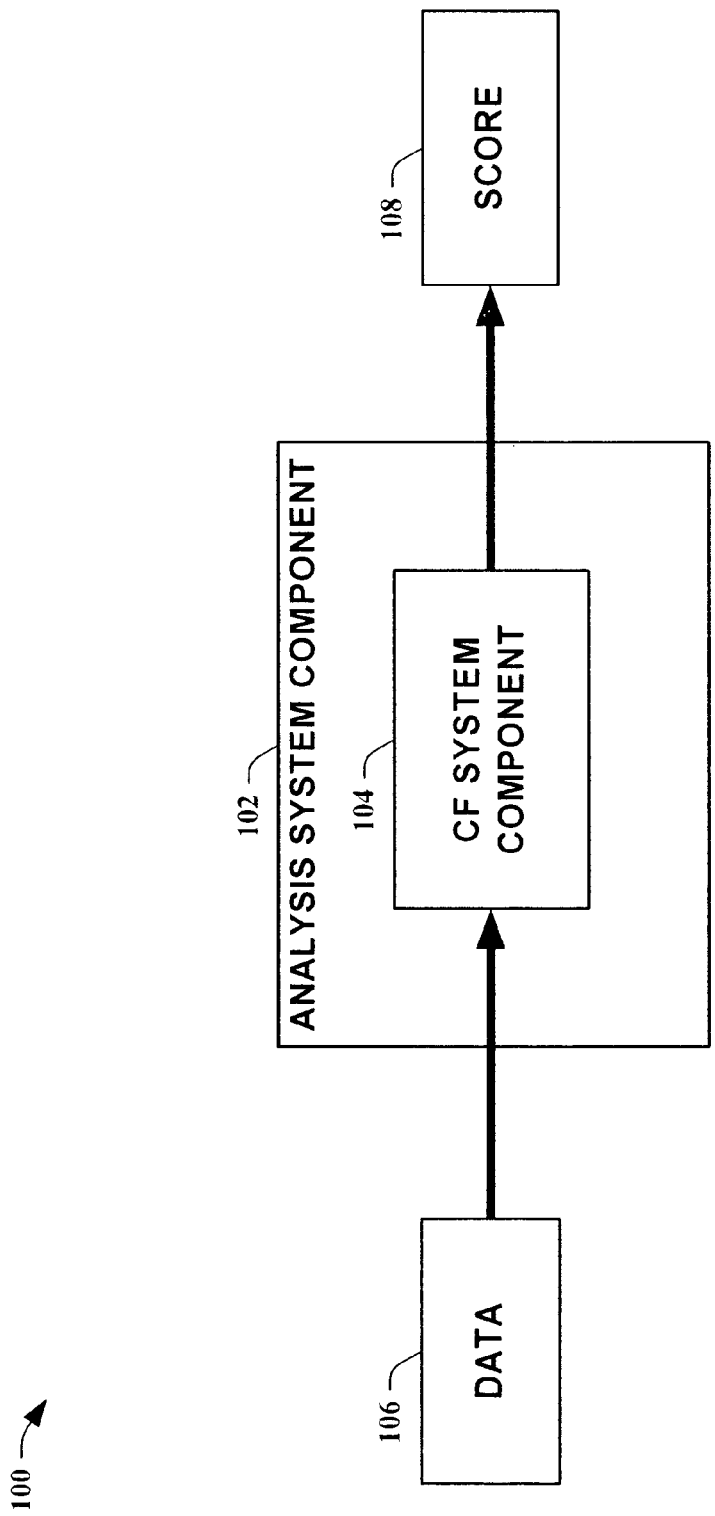
FIG. 1 is a block diagram of an analysis system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention provides improvements to systems and methods for collaborative filtering. The improvements include new algorithms for collaborative filtering. The algorithms are based on association rules with various methods of statistical smoothing (maximum likelihood/support and expected values/priors). They quickly create models that can efficiently predict both the probability that a user will like an item and/or the similarity between items.

Collaborative filtering (CF) is the task of predicting user preferences over items such as books, television shows, movies, and web pages. Collaborative filtering helps drive sales at Internet commerce sites such as book, music, and clothes retailers and the like. The present invention dramatically improves the recommendations available to customers in several important scenarios. This invention helps sites utilizing online processing tools compete with large complex online sites by improving the quality of a seller's product-to-product recommendations. CF is also a central feature for digital media systems such as digital television recording systems. The present invention improves digital media offerings by simplifying the user interface and increasing user satisfaction. It is memory efficient enough for deployment on set-top boxes and other small memory/processor devices and the like. It is also computationally efficient enough for deployment on servers where processing time is critical.

Early CF technology made good recommendations but did not run fast enough for broad utilization on servers. These processes were also too memory intensive for many television applications. Second generation technology, utilizing dependency nets (DN), was computationally fast and more memory efficient. However, in some scenarios, model creation was slow and the quality of its recommendations became poor. The present invention speeds up model creation and improves the quality of recommendations in scenarios for which DN is weak. It matches DN's speed, and yet, is an extremely memory efficient method, making it suitable for deployment on even low memory set-top boxes and the like. It can also be combined with DN, creating a fast system that gives good recommendations over a broad range of scenarios.

In FIG. 1, a block diagram of an analysis system 100 in accordance with an aspect of the present invention is shown. The analysis system 100 is comprised of an analysis system component 102. In this instance of the present invention, the analysis system component is comprised of a collaborative filtering system component 104. Data 106 is input into the system 100 and processed by the collaborative filtering system component 104 to produce a score 108 for the data. The score 108 represents a value of a measure of association for the input data 106. In this manner, multiple data can be input to provide a list representative of various scoring values. A higher value can indicate a more preferential association than a lower score value. Subsequent associations can also be derived from the list based upon the computed scores. As an example, several television show preferences can be input as data. A resulting scoring list might show several scores in close proximity. It can be assumed that a television viewer who liked one of the shows in that grouping might also like the other shows in the grouping.

Figure 2:
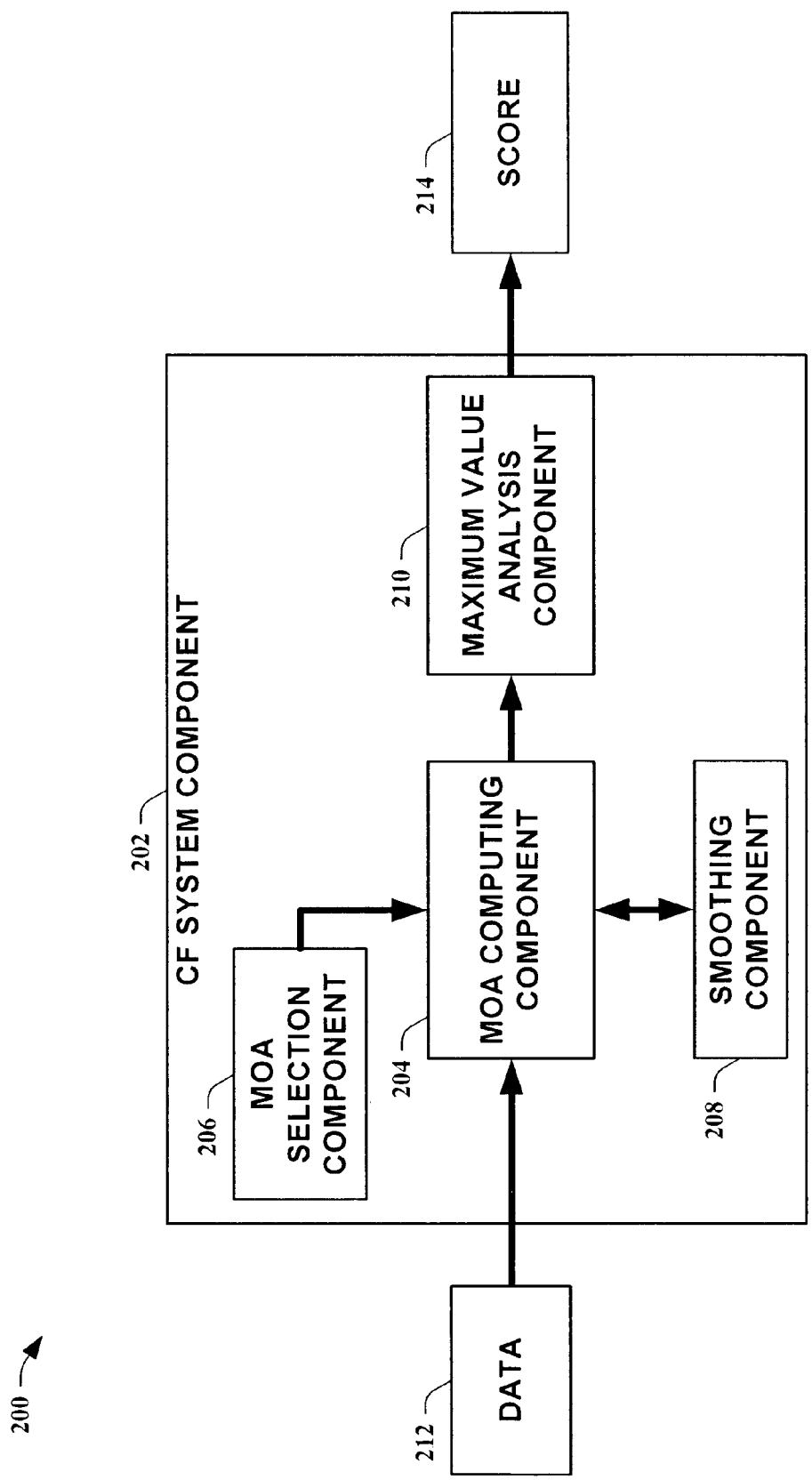
FIG. 2 is a block diagram of a collaborative filtering system in accordance with an aspect of the present invention.

Turning to FIG. 2, a block diagram of a collaborative filtering system 200 in accordance with an aspect of the present invention is illustrated. The collaborative filtering system 200 is comprised of a collaborative filtering system component 202 with input data 212 and a resulting score 214. The collaborative filtering system component 202 is comprised of a measure of association (MOA) computing component 204, a measure of association selection component 206, a smoothing component 208, and a maximum value analysis component 210. The MOA selection component 206 selects a desired or proper measure of association that is utilized by the MOA computing component 204 to determine a measure of association for the input data 212. Techniques and details of the MOA selection component 206 are described infra. The smoothing component 208 facilitates in smoothing out maximum likelihood estimator (MLE) estimates that are utilized by the MOA computing component 204. Details and techniques with regard to this component are discussed further infra. The maximum value analysis component 210 determines an appropriate score for a measure of association when multiple scores are available due to multiple measures of association rules being applicable to the input data 212. A maximum value among the rules can be established and utilized as the output resulting score 214. Techniques for determining the maximum value are detailed infra.

Figure 3:
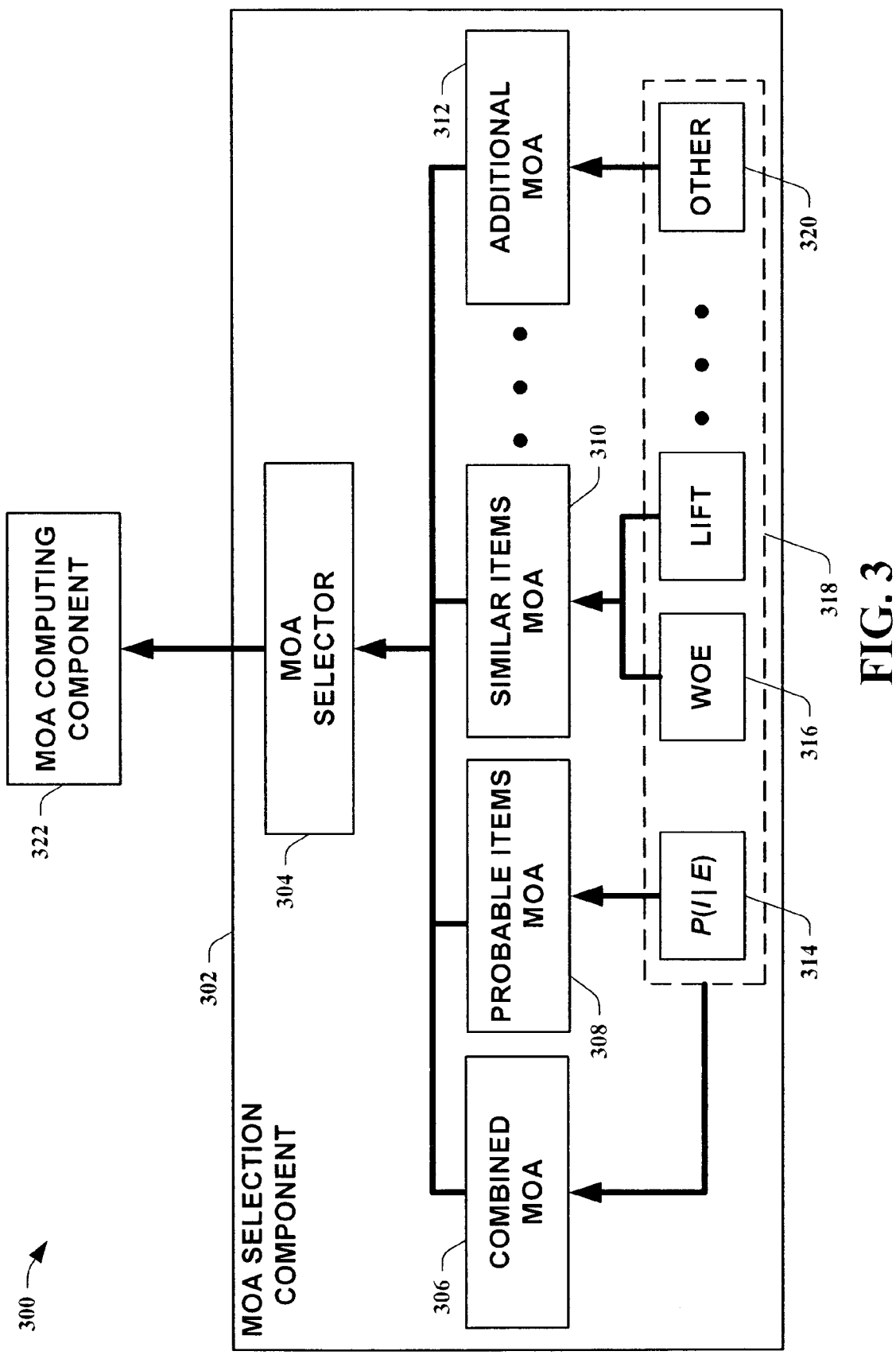
FIG. 3 is a block diagram of a measure of association selection system in accordance with an aspect of the present invention.

Referring to FIG. 3, a block diagram of a measures-of-association selection system 300 in accordance with an aspect of the present invention is illustrated. The MOA selection system 300 is comprised of an MOA selection component 302 and an MOA computing component 322. The MOA selection component 302 determines a measure of association to be utilized by the MOA computing component 322. It 302 is comprised of an MOA selector 304, a combined MOA 306, a probable items MOA 308, a similar items MOA 310, and additional MOA 312. Each entity 306-312 can be comprised of multiple like entities. The probable items MOA 308 utilizes a probability algorithm, for example P(I|E) 314, as a basis for its measure of association. The similar items MOA 310 utilizes a similarity algorithm for its measure of association. Examples of similarity algorithms include Weight of Evidence (WOE) algorithms 316 and/or Lift algorithms 318 and the like. Other algorithms 320 can be employed as a basis for measures of association for the additional MOA 312. The combined MOA 306 utilizes algorithms 318 to provide a measure of association that can include such aspects as probability and similarity. The algorithms 318 can include, for example, algorithms 314-318 utilized by other MOA's 308-310. Other unique algorithms can also be employed as represented by Other algorithms 320. The MOA selector 304 selects an appropriate and/or desired measure of association that is to be employed by the MOA computing component 322.

Figure 4:
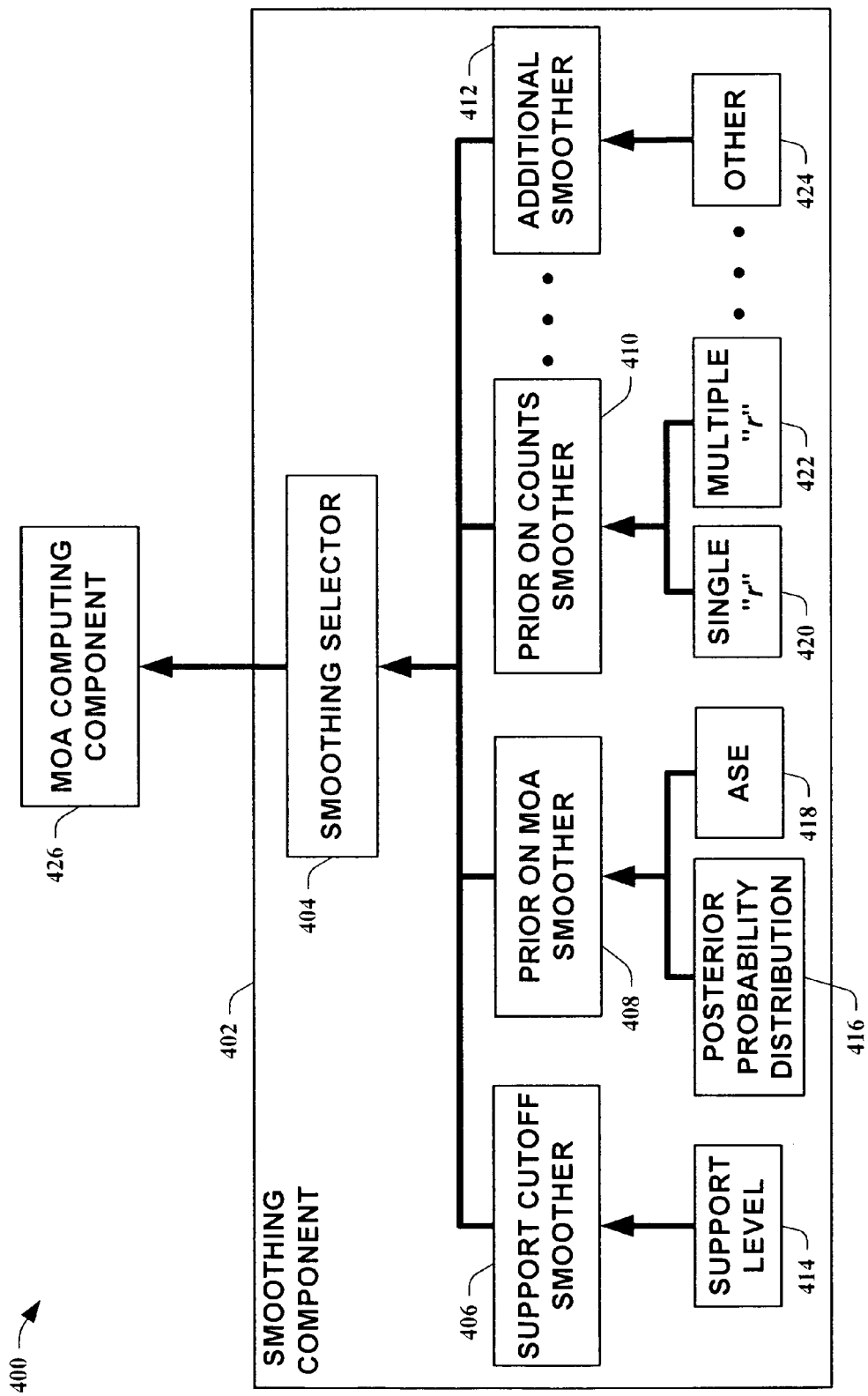
FIG. 4 is a block diagram of a smoothing system in accordance with an aspect of the present invention.

Moving on to FIG. 4, a block diagram of a smoothing system 400 in accordance with an aspect of the present invention is shown. The smoothing system 400 is comprised of a smoothing component 402 and an MOA computing component 426. The smoothing component 402 facilitates the MOA computing component 426 by providing smoothing of MLE estimates employed in scoring data. The smoothing component 402 is comprised of a smoothing selector 404, a support cutoff smoother 406, a prior on MOA smoother 408, a prior on counts smoother 410, and an additional smoother 412. Each entity 406-412 can be comprised of multiple like entities. The support cutoff smoother 406 utilizes a support level 414 (i.e., threshold) to provide smoothing. If a particular entity/item does not have adequate support, it is rejected. This is elaborated infra. The prior on MOA smoother 408 utilizes prior knowledge such as, for example, a posterior probability distribution 416 and/or an asymptotic standard error (ASE) 418, to provide smoothing. Details are described infra. The prior on counts smoother 410 employs an added count such as, for example, a single count "r" and/or a multiple count "r," to provide smoothing. This is discussed further infra. The additional smoother 412 can incorporate other techniques 424 that can include, for instance, combinations of the named smoothers 406-410 and/or additional smoothers that provide smoothing based on combinations of other smoothing techniques 414-422 and/or additional smoothing techniques.

Comprehension of the present invention can be facilitated by exploring in detail how entities mentioned supra operate and interrelate. The present invention employs pairwise association rules for collaborative filtering. Pairwise association rules are a well known way of representing the idea that interest in one item may indicate interest in another. For example, the following association rule:

$$\text{bread} \rightarrow \text{peanut butter} | 60\% \tag{1}$$

represents that "the probability of peanut butter given bread is 60%." Thus, people who have or buy peanut butter have a 60 percent likelihood of also having or wanting bread (most likely so that they can make a sandwich). In this fashion, sets of items can be compared to establish associative rules that can be applied to future data.

The present invention creates a collaborative filtering system from association rules by first choosing appropriate measures of association (MOA). The association between two items can be measured many ways. When it is desirable for a CF system to recommend probable items then a conditional probability based MOA can be appropriate. For example, for the association rule:

$$E \rightarrow I \tag{2}$$

a measure of association can be given by:

$$P(I|E) \tag{3}$$

which is the probability of I given E. When it is desirable for a CF system to recommend similar items, Weight of Evidence (WOE) and/or Lift can be more appropriate. Weight of Evidence from E to I is given by:

$$\ln \frac{P(E \mid I)}{P(E \mid \bar{I})} \qquad (4)$$

and Lift is given by:

$$\frac{P(I \mid E)}{P(I)}. \qquad (5)$$

Other measures of association are also possible including those that give weight to both similarity and general popularity.

Once an appropriate or desirable measure of association has been established, the measures of association are computed from data input into a collaborative filtering system. A naïve way to compute measure of association is with a maximum-likelihood estimator (MLE) that can be easily determined from the data. The computed measure of association becomes a score of an item I. Items can then be sorted by their scores to create a recommendation list.

In CF systems it is often the case that multiple association rules can imply the same item I. One method of the present invention to get a single score for item I, when multiple items imply it, is to give it a maximum value determined from rules that imply the item.

A well-known generalization of pairwise association rules is to have more than one item on a left-hand side (LHS) of the rule. For example:

bread, jelly→peanut butter|55%  (6)

indicates that "the probability of peanut butter given bread and jelly is 55%."

When applied to collaborative filtering, this introduces an issue of how to combine effects of multiple rules that have overlapping left-hand sides and a same right-hand side (RHS). For example, consider two rules that overlap such as:

E1, E2→I|60%  (7)

and

E1→I|55%.  (8)

One way to solve the issue is to give an item a maximum value of the rules that imply it, even when those rules have overlapping left-hand sides. This method works especially well with measures of association in which more specific (longer) rules tend to have stronger associations, as is the case with Lift and Weight of Evidence, but not Conditional Probability.

A problem when using maximum-likelihood estimators (MLE) when computing a measure of association is that a measure can be overly sensitive to particular observed counts. For example, if only one person in a data set bought bread and that person also bought peanut better, the MLE for the conditional probability score for peanut butter given bread is 1, the Lift score is also 1, and the Weight of Evidence score is infinity. In all three cases, they represent the most extreme scores achievable. Statistical techniques for computing measures that are less sensitive to coincidence than MLE are called smoothing.

One approach to achieve smoothing with the present invention is smoothing with support cutoffs. In this approach, only rules of association with a minimum level of support are considered. Support, in this case, is the number of users in a data set who expressed interest in all products mentioned in a rule. For example, only association rules with a support of at least 10 might be considered (this would establish a "threshold" of 10 in this example). When a measure of interest employed is Weight of Evidence (and in other cases also) another definition of support is appropriate. It is defined, in this instance, as a minimum of counts of a, b, c, d, where:

a is a number of users who expressed interest in none of the items;

b is a number of users who expressed interest in an item on a right-hand side of an association rule, but not in all items of a left-hand side of the association rule;

c is a number of users who expressed interest in all items of the left-hand side of the association rule, but not in an item on the right-hand side of the association rule; and d is a number of users who expressed interest in all items mentioned in the association rule.

Another, complementary, way to smooth is by adding a pseudo count of r (where r is a real value greater than 0) to all counts before calculating MLE values. This is referred to as smoothing with a prior on counts. For example, if r is ½, then the present invention computes an MLE with counts a+½, b+½, c+½, and d+½. More generally, different counts can be added to different cells instead of having a single value count.

The smoothing methods given so far address the problem of coincidence among the counts for a given association rule. When many association rules are considered, a second problem with coincidence appears, namely, as more and more association rules are employed, the expected number of rules with apparently strong association by chance increases.

One method to address this problem employed by the present invention is to put a prior probability distribution on some of the uninteresting measures of association. This is known as smoothing with a prior on a measure of association or "informative priors on measures of association." Informative prior is a term of art signifying that background knowledge is applied to set a prior probability. This is contrary to an "uninformative prior" which typically is a uniform distribution over a range of plausible values. For example, suppose that based on prior knowledge it is expected that there is to be no association in 99% of the pairwise associations considered and no association in 99.9% of higher order associations. Moreover, suppose Weight of Evidence is being employed. Then utilizing techniques, such as Bayesian methods disclosed in CFW technical report MSR-TR-2002-46 (*CFW: A Collaborative Filtering System Using Posteriors Over Weights of Evidence*; Carl M. Kadie, Christopher Meek, and David E. Heckerman), a prior of 99% (or 99.9%) can be put on WOE=0 and then a posterior probability distribution on WOE can be computed. This posterior distribution can be made into a score by the methods mentioned in the CFW technical report, id, and/or by computing the expected value of the Weight of Evidence.

Similarly, classical statistical methods can give asymptotic standard errors of the MLE. The test on the error can be made more difficult as the number of association rules to be considered increases. Classical measures (estimates) of association for 2×2 tables have been studied for decades. Among the most popular is the cross-product ratio (also called the odds ratio), which on table $[[a,b],[c,d]]$ is $\hat{\theta}=ad/bc$. Other measures include:

the log of the cross-product ratio;

Yule's Q, which is the 2×2 version of the Gamma measure,

Phi, which is the 2×2 version of Pearson's correlation coefficient, and various "tau" measures (see, Reynolds, H. T. (1984); *Analysis of Nominal Data*, 2nd Edition; Sage Publications; Newbury Park, Calif. and Gibbons, J. D. (1993); *Nonparametric Measures of Association*; Sage Publications; Newbury Park, Calif.

The accuracy of these measures of association can be characterized with the asymptotic standard error (ASE) of the estimator. For example, the standard error for the log of the cross-product ratio (see, Agresti, A. (1990); Categorical Data Analysis; John Wiley & Sons, New York) is given by:

$$se(\log \hat{\theta}) = (1/a + 1/b + 1/c + 1/d)^{1/2}. \quad (9)$$

The standard error can then be used to estimate a confidence interval due to the asymptotic normality of the estimator log $\hat{\theta}$.

In view of the exemplary systems shown and described above, methodologies that may be implemented in accordance with the present invention will be better appreciated with reference to the flow charts of FIGS. 5-9. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 5:
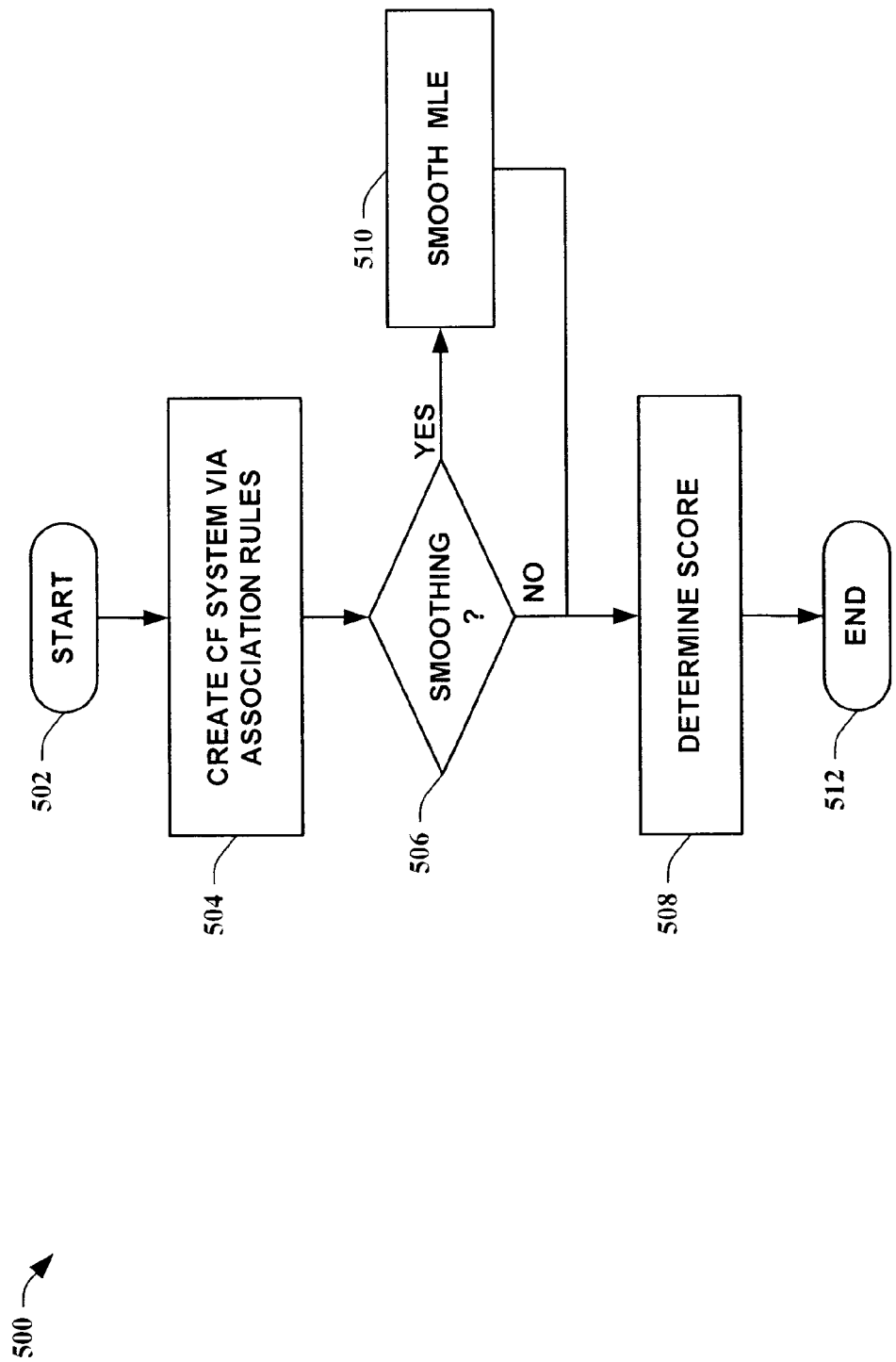
FIG. 5 is a flow diagram of a method for data analysis in accordance with an aspect of the present invention.

In FIG. 5, a flow diagram of a method 500 for data analysis in accordance with an aspect of the present invention is depicted. This method 500 is an overall flow illustrating how a score is computed for data inputted into a data analysis system. The method 500 starts 502 by creating a collaborative filtering system based on association rules 504. The association rules can be based on probability and/or similarity based rules. A determination is made as to whether smoothing for maximum likelihood estimator (MLE) estimates is desired 506. If yes, the MLE is smoothed utilizing various smoothing methods described supra and infra 510. A measure of association score is then determined 508, ending the flow 512. If smoothing is not desired 506, a measure of association score is determined 508, ending the flow 512.

Figure 6:
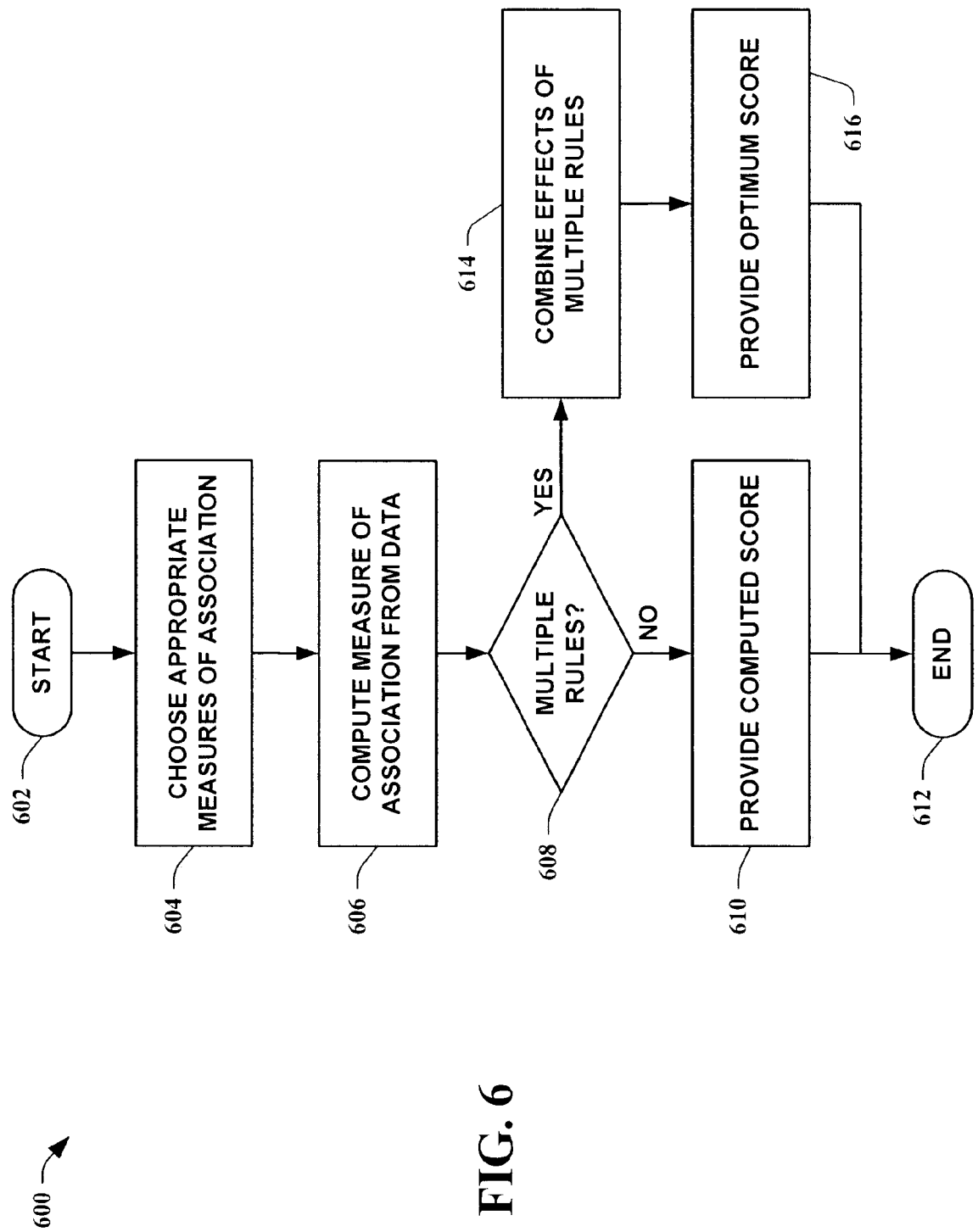
FIG. 6 is a flow diagram of a method for collaborative filtering in accordance with an aspect of the present invention.

Turning to FIG. 6, a flow diagram of a method 600 for collaborative filtering in accordance with an aspect of the present invention is shown. This method 600 illustrates how the present invention's collaborative filtering system utilized in a data analysis system operates at an overview level. The method 600 starts 602 by choosing appropriate measures of association 604. These techniques are elaborated both supra and infra. The appropriate measure of association is then utilized to compute a measure of association score from data input into a system 606. A determination is then made as to whether there are multiple rules of association that are applicable to a given piece of data or item 608. If not, the computed association score is maintained 610, ending the flow 612. If multiple rules are applicable 608, effects of the multiple rules are combined 614. An optimum value is then obtained from the multiple rules and provided as a measure of association score 616, ending the flow 612.

Figure 7:
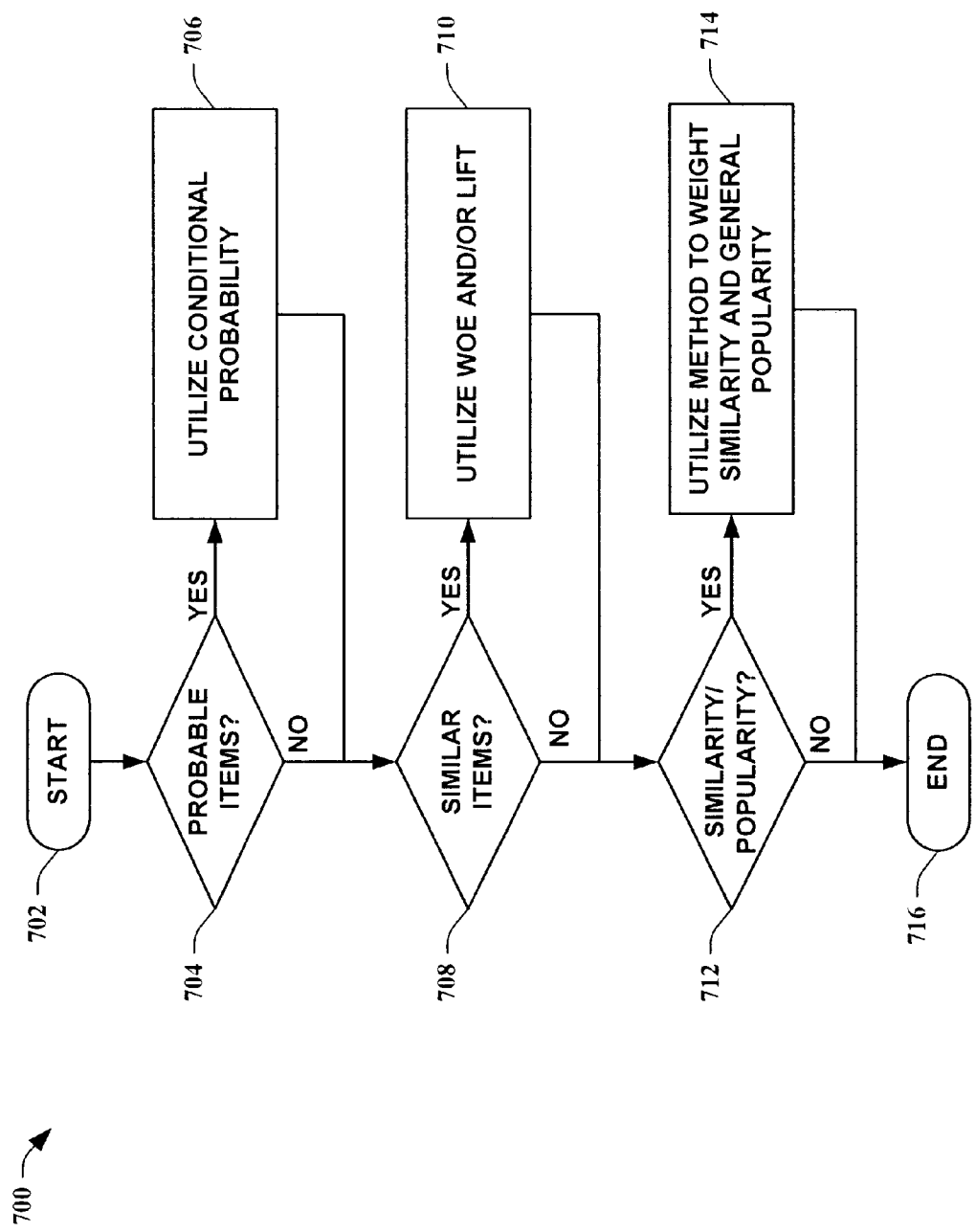
FIG. 7 is a flow diagram of a method for choosing measures of association for collaborative filtering in accordance with an aspect of the present invention.

Moving on to FIG. 7, a flow diagram of a method 700 for choosing measures of association for collaborative filtering in accordance with an aspect of the present invention is illustrated. The method 700 starts 702 by determining if probable items are desired 704. If yes, a conditional probability algorithm is employed to determine a score for an item based on the likelihood that it will occur 706 and the method 700 continues. If probable items are not desired, a determination is made as to whether similar items are desired 708. If yes, a Weight of Evidence algorithm and/or a Lift algorithm are employed to determine an association score 710 and the method 700 continues. If similar items are not desired 708, a determination is made as to whether a combination of similarity/popularity based items is desired 712. If yes, an algorithm/method is utilized to weight both similarity and general popularity to determine an association score 714, ending the flow 716. If similarity/popularity of an item is not desired 712, the flow ends 716. The present invention can employ these methods and/or algorithms and also other methods and/or algorithms dependent upon desirable characteristics for a measure of association score.

Figure 8:
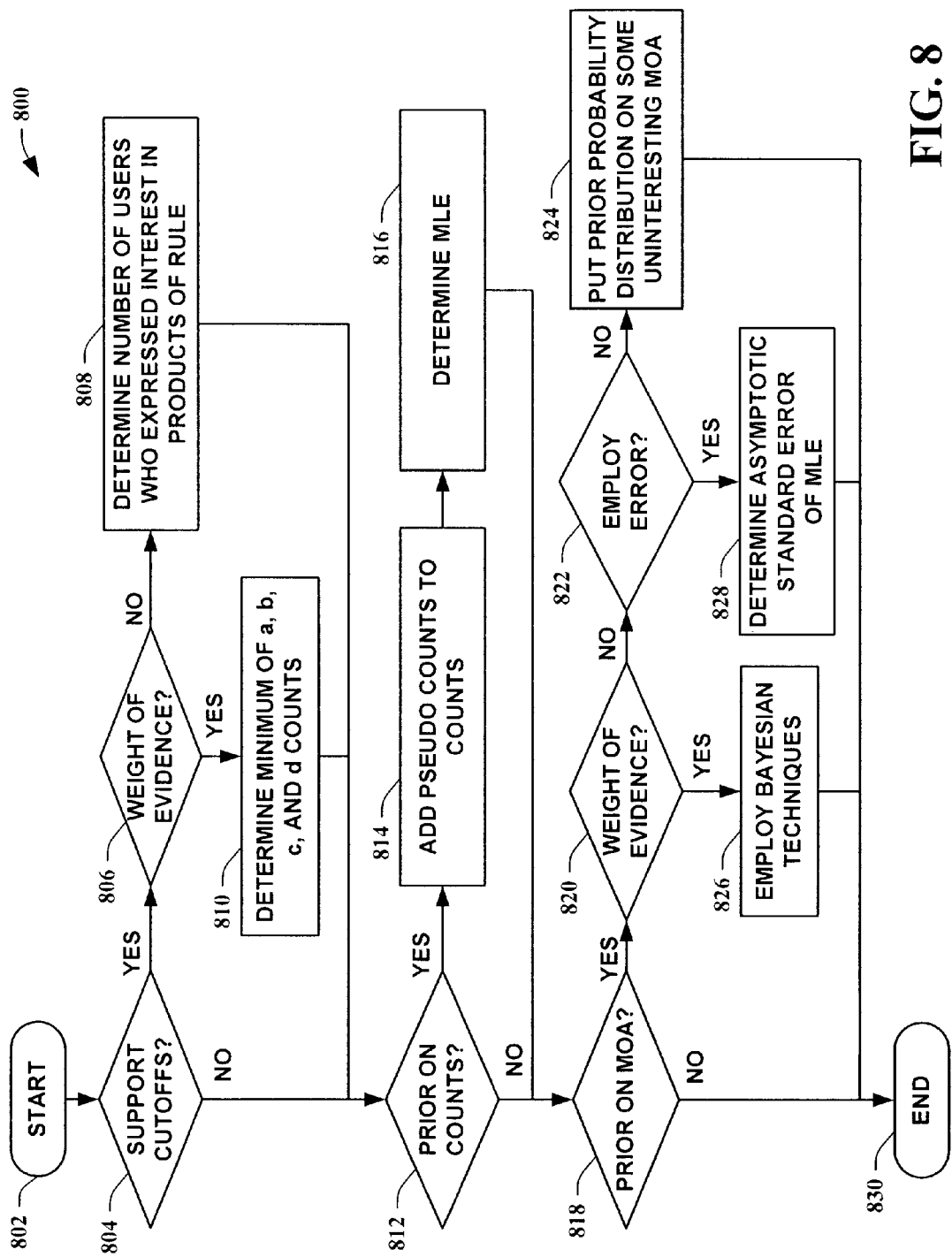
FIG. 8 is a flow diagram of a method for smoothing maximum likelihood estimators (MLE) estimates for collaborative filtering in accordance with an aspect of the present invention.

In FIG. 8, a flow diagram of a method 800 for smoothing maximum likelihood estimator (MLE) estimates for collaborative filtering in accordance with an aspect of the present invention are depicted. The method 800 illustrates several methods of smoothing in one instance of the present invention. The method 800 starts 802 by making a determination as to whether a support cutoff method is desired 804. If yes, a determination is then made as to whether a Weight of Evidence method is desired 806. If no, a support value or "threshold" is determined based on a number of users who expressed an interest in products of an association rule 808 and the method 800 continues. This value is a minimum acceptable count for incorporating effects from that particular association. Anything below this threshold is not utilized. If Weight of Evidence is desired 806, a minimum acceptable value or threshold is determined based on counts of parameters a, b, c and d as defined supra and the method 800 continues. If support cutoff is not desired 804, a determination is made as to whether a prior on counts is desired 812. If yes, pseudo counts are added to determine counts in either via a single pseudo count or multiple pseudo counts per cell 814. Since this method is complementary, the pseudo counts can be incorporated and then an MLE can be utilized to determine estimates 816 and the method 800 continues. If, however, prior on counts is not desired 812, a determination is made as to whether a prior on measures of association is desired 818. If not, the flow ends 830. However, if yes, a determination is made as to whether Weight of Evidence is desired 820. If yes, Bayesian techniques are employed as described supra to give prior distributions based on weights of evidence 826, ending the flow 830. If weights of evidence are not desired 820, a determination is made as to whether employing an error method is desired 822. If yes, an asymptotic standard error is determined for an MLE utilizing methods of the present invention and/or classical statistical methods described supra 828. If it is not desired to employ error techniques 822, a prior probability distribution is utilized with regard to a subset of measures of association 824, ending the flow 830.

Figure 9:
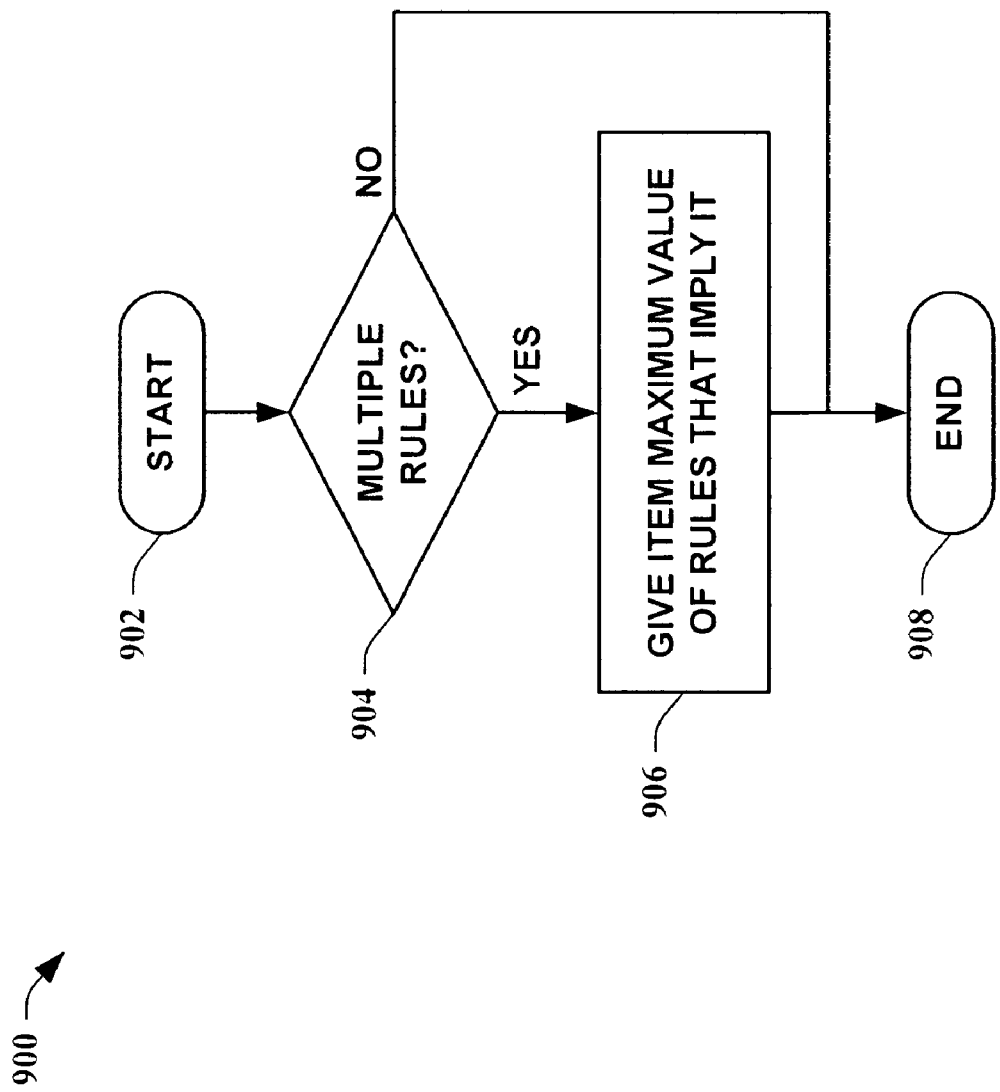
FIG. 9 is a flow diagram of a method for scoring higher-order item sets for collaborative filtering in accordance with an aspect of the present invention.

Referring to FIG. 9, a flow diagram of a method 900 for scoring higher-order item sets for collaborative filtering in accordance with an aspect of the present invention is shown. The method 900 starts 902 by determining if multiple rules exist that imply an item/piece of data 904. Examples of higher order item rules are given supra. Typically, if the item/piece of data is not implied by multiple rules, its original computed measure of association score is maintained, ending the flow 908. However, if the item/piece of data is implicated in multiple rules, a maximum value is determined out of scores based on the implicating rules 906, ending the flow 908.

Figure 10:
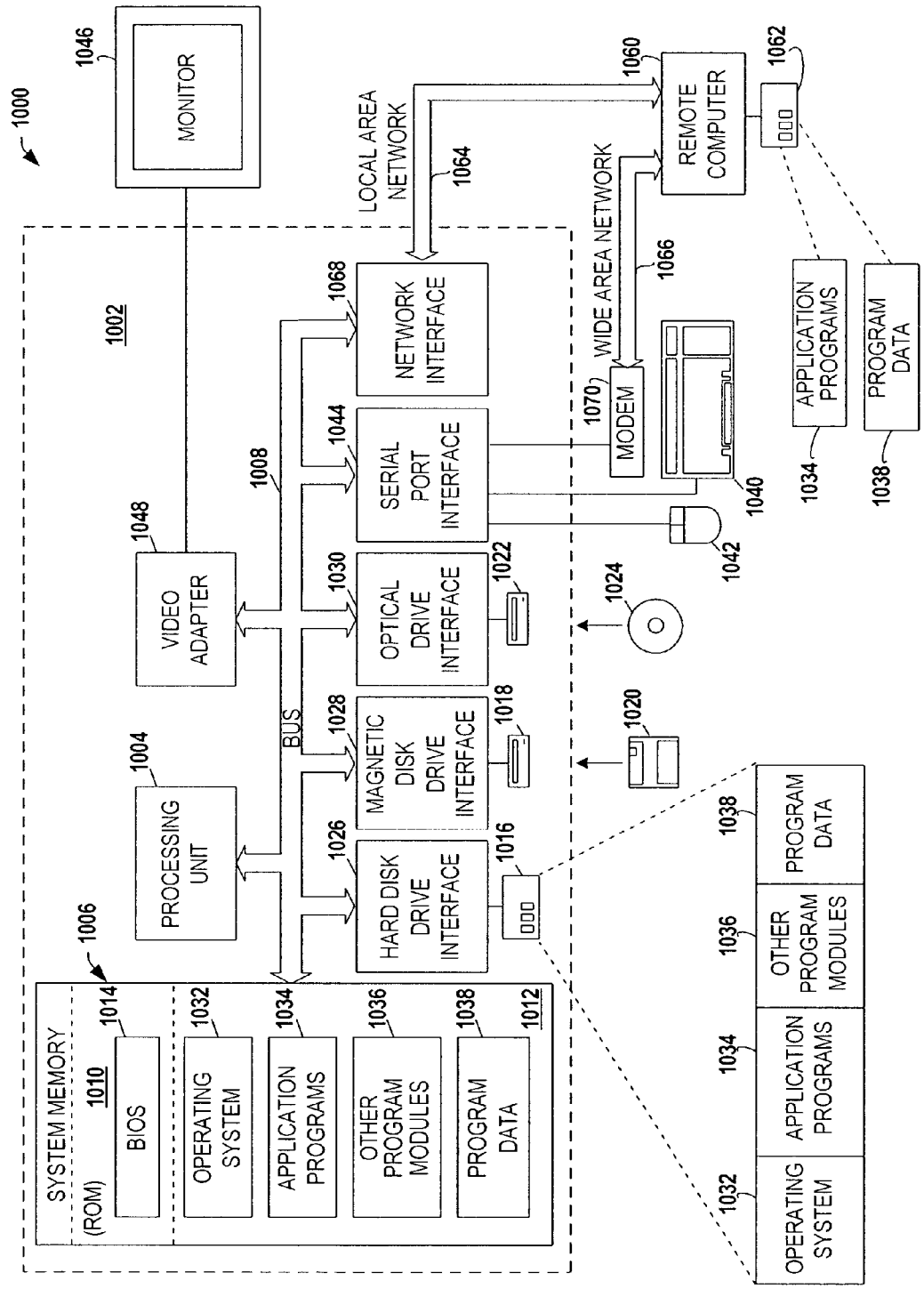
FIG. 10 illustrates an example operating environment in which the present invention can function.

In order to provide additional context for implementing various aspects of the present invention, FIG. 10 and the following discussion are intended to provide a brief, general description of a suitable computing environment 1000 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 10, an exemplary system environment 1000 for implementing the various aspects of the invention includes a conventional computer 1002, including a processing unit 1004, a system memory 1006, and a system bus 1008 that couples various system components, including the system memory, to the processing unit 1004. The processing unit 1004 may be any commercially available or proprietary processor. In addition, the processing unit may be implemented as multi-processor formed of more than one processor, such as may be connected in parallel.

The system bus 1008 may be any of several types of bus structure including a memory bus or memory controller, a peripheral bus, and a local bus using any of a variety of conventional bus architectures such as PCI, VESA, Microchannel, ISA, and EISA, to name a few. The system memory 1006 includes read only memory (ROM) 1010 and random access memory (RAM) 1012. A basic input/output system (BIOS) 1014, containing the basic routines that help to transfer information between elements within the computer 1002, such as during start-up, is stored in ROM 1010.

The computer 1002 also may include, for example, a hard disk drive 1016, a magnetic disk drive 1018, e.g., to read from or write to a removable disk 1020, and an optical disk drive 1022, e.g., for reading from or writing to a CD-ROM disk 1024 or other optical media. The hard disk drive 1016, magnetic disk drive 1018, and optical disk drive 1022 are connected to the system bus 1008 by a hard disk drive interface 1026, a magnetic disk drive interface 1028, and an optical drive interface 1030, respectively. The drives 1016-1022 and their associated computer-readable media provide nonvolatile storage of data, data structures, computer-executable instructions, etc. for the computer 1002. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1000, and further that any such media may contain computer-executable instructions for performing the methods of the present invention.

A number of program modules may be stored in the drives 1016-1022 and RAM 1012, including an operating system 1032, one or more application programs 1034, other program modules 1036, and program data 1038. The operating system 1032 may be any suitable operating system or combination of operating systems. By way of example, the application programs 1034 can include a collaborative filtering component that employs smoothing components that facilitate in providing a measure of association score in accordance with an aspect of the present invention.

A user can enter commands and information into the computer 1002 through one or more user input devices, such as a keyboard 1040 and a pointing device (e.g., a mouse 1042). Other input devices (not shown) may include a microphone, a joystick, a game pad, a satellite dish, wireless remote, a scanner, or the like. These and other input devices are often connected to the processing unit 1004 through a serial port interface 1044 that is coupled to the system bus 1008, but may be connected by other interfaces, such as a parallel port, a game port or a universal serial bus (USB). A monitor 1046 or other type of display device is also connected to the system bus 1008 via an interface, such as a video adapter 1048. In addition to the monitor 1046, the computer 1002 may include other peripheral output devices (not shown), such as speakers, printers, etc.

It is to be appreciated that the computer 1002 can operate in a networked environment using logical connections to one or more remote computers 1060. The remote computer 1060 may be a workstation, a server computer, a router, a peer device or other common network node, and typically includes many or all of the elements described relative to the computer 1002, although, for purposes of brevity, only a memory storage device 1062 is illustrated in FIG. 10. The logical connections depicted in FIG. 10 can include a local area network (LAN) 1064 and a wide area network (WAN) 1066. Such networking environments are commonplace in offices, enterprise-wide computer networks, intranets and the Internet.

When used in a LAN networking environment, for example, the computer 1002 is connected to the local network 1064 through a network interface or adapter 1068. When used in a WAN networking environment, the computer 1002 typically includes a modem (e.g., telephone, DSL, cable, etc.) 1070, or is connected to a communications server on the LAN, or has other means for establishing communications over the WAN 1066, such as the Internet. The modem 1070, which can be internal or external relative to the computer 1002, is connected to the system bus 1008 via the serial port interface 1044. In a networked environment, program modules (including application programs 1034) and/or program data 1038 can be stored in the remote memory storage device 1062. It will be appreciated that the network connections shown are exemplary and other means (e.g., wired or wireless) of establishing a communications link between the computers 1002 and 1060 can be used when carrying out an aspect of the present invention.

In accordance with the practices of persons skilled in the art of computer programming, the present invention has been described with reference to acts and symbolic representations of operations that are performed by a computer, such as the computer 1002 or remote computer 1060, unless otherwise indicated. Such acts and operations are sometimes referred to as being computer-executed. It will be appreciated that the acts and symbolically represented operations include the manipulation by the processing unit 1004 of electrical signals representing data bits which causes a resulting transformation or reduction of the electrical signal representation, and the maintenance of data bits at memory locations in the memory system (including the system memory 1006, hard drive 1016, floppy disks 1020, CD-ROM 1024, and remote memory 1062) to thereby reconfigure or otherwise alter the computer system's operation, as well as other processing of signals. The memory locations where such data bits are maintained are physical locations that have particular electrical, magnetic, or optical properties corresponding to the data bits.

Figure 11:
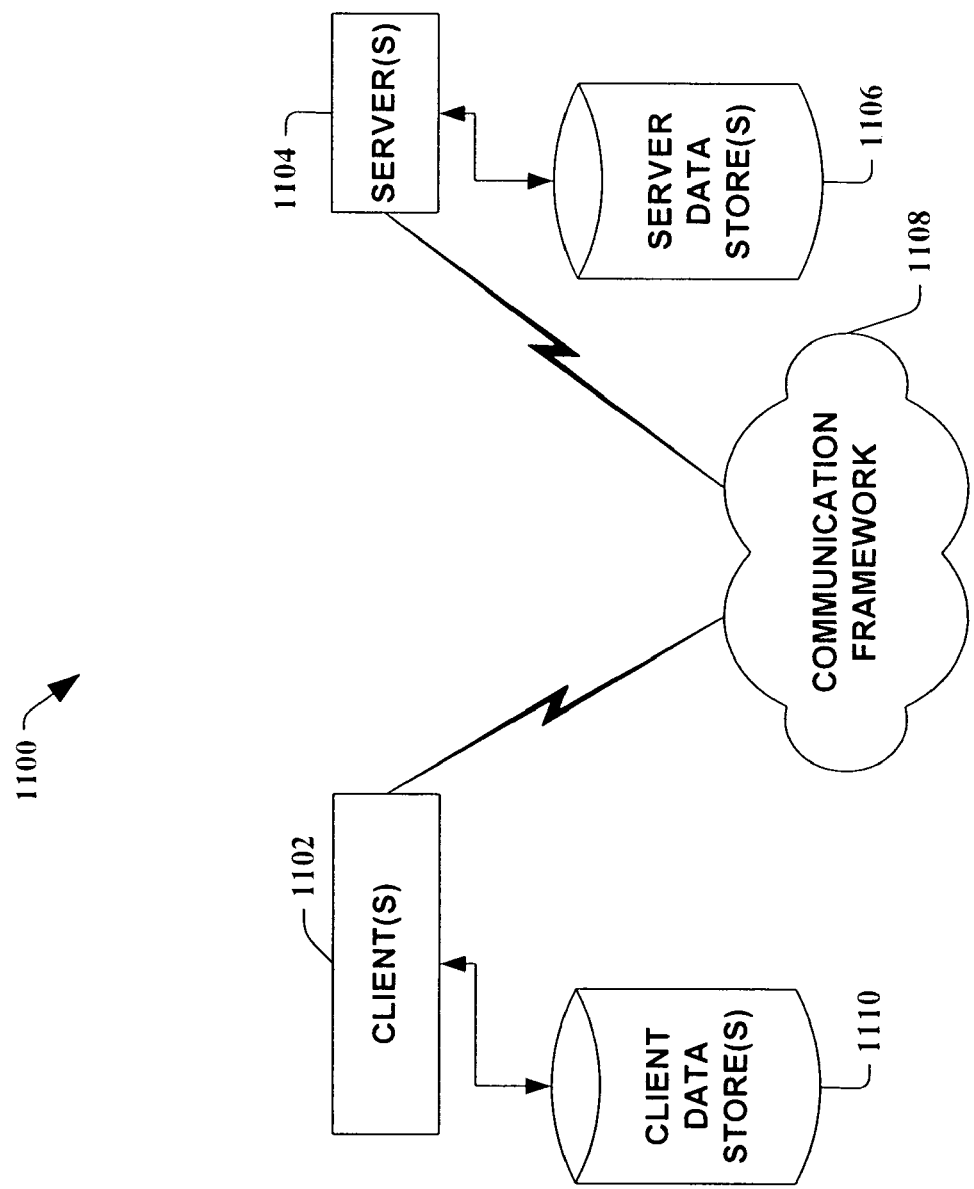
FIG. 11 illustrates another example operating environment in which the present invention can function.

FIG. 11 is another block diagram of a sample computing environment 1100 with which the present invention can interact. The system 1100 further illustrates a system that includes one or more client(s) 1102. The client(s) 1102 can be hardware and/or software (e.g., threads, processes, computing devices). The system 1100 also includes one or more server(s) 1104. The server(s) 1104 can also be hardware and/or software (e.g., threads, processes, computing devices). The servers 1104 can house threads to perform transformations by employing the present invention, for example. One possible communication between a client 1102 and a server 1104 may be in the form of a data packet adapted to be transmitted between two or more computer processes. The system 1100 includes a communication framework 1108 that can be employed to facilitate communications between the client(s) 1102 and the server(s) 1104. The client(s) 1102 are operably connected to one or more client data store(s) 1110 that can be employed to store information local to the client(s) 1102. Similarly, the server(s) 1104 are operably connected to one or more server data store(s) 1106 that can be employed to store information local to the servers 1104.

In one instance of the present invention, a data packet is transmitted between two or more computer components that facilitates collaborative filtering, the data packet comprised of, at least in part, collaborative filtering data based, at least in part, on collaborative filtering employing statistical smoothing techniques.

In another instance of the present invention, a computer readable medium storing computer executable components of a system that facilitates collaborative filtering, the system comprised of, at least in part, a collaborative filtering component that produces item scoring based, at least in part, on a collaborative filtering employing statistical smoothing techniques.

It is to be appreciated that the systems and/or methods of the present invention can be utilized in a collaborative filtering scheme for facilitating computer components and non-computer related components alike. Further, those skilled in the art will recognize that the systems and/or methods of the present invention can be employed in a vast array of electronic related technologies, including, but not limited to, computers, servers, television related products, media products, search engines, business related products, and/or handheld electronic devices and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of data analysis, employing collaborative filtering, implemented as instructions executed on a processor operatively coupled to memory, the method comprising:
receiving an item set containing at least one item of input data;
selecting an appropriate measure of association from among known measures of association, the selection is based on the known measures of association and the item set;
scoring at least one item of the item set by employing the selected measure of association;
selecting at least one additional measure of association based on the item set;
scoring at least one item of the item set by employing the at least one additional measure of association;
smoothing at least one item of the item set via a selected smoother; and
employing at least one multiple-score collaborative filtering evaluation method to obtain a single score for an item when more than one measure of association score applies to that item;
wherein the instructions executed on the processor operatively coupled to memory facilitate the receiving, selecting, scoring, smoothing and employing.

2. The method of claim 1,
wherein the collaborative filtering employs Lift, smoothed via prior on counts smoothing techniques, as a measure of association for scoring at least one item of the item set.

3. The method of claim 1,
wherein the collaborative filtering employs Lift, smoothed via informative priors on measures of association smoothing techniques, as a measure of association for scoring at least one item of the item set.

4. The method of claim 1,
wherein the collaborative filtering employs Lift, smoothed via nonuniform prior smoothing techniques, as a measure of association for scoring at least one item of the item set.

5. The method of claim 1,
wherein the collaborative filtering employs Weight of Evidence, smoothed via cutoff smoothing techniques, as a measure of association for scoring at least one item of the item set.

6. The method of claim 1,
wherein the collaborative filtering employs Weight of Evidence, smoothed via prior on counts smoothing techniques, as a measure of association for scoring at least one item of the item set, the item set comprising a higher-order item set wherein more than one item is represented on a left-hand side of an association rule applicable to at least one item in the item set.

7. The method of claim 1, wherein the collaborative filtering employs Weight of Evidence, smoothed via informative priors on measures of association smoothing techniques, as a measure of association for scoring at least one item of the item set.

8. The method of claim 1, wherein the collaborative filtering employs Weight of Evidence, smoothed via nonuniform prior smoothing techniques, as a measure of association for scoring at least one item of the item set.

9. The method of claim 1, wherein the collaborative filtering employs Yule's Q, smoothed via cutoff smoothing techniques, as a measure of association for scoring at least one item of the item set.

10. The method of claim 1, wherein the collaborative filtering employs Yule's Q, smoothed via prior on counts smoothing techniques, as a measure of association for scoring at least one item of the item set, the item set comprising a higher-order item set wherein more than one item is represented on a left-hand side of an association rule applicable to at least one item in the item set.

11. The method of claim 1, wherein the collaborative filtering employs Yule's Q, smoothed via informative priors on measures of association smoothing techniques, as a measure of association for scoring at least one item of the item set.

12. A method of claim 1, wherein the collaborative filtering employs Yule's Q, smoothed via nonuniform prior smoothing techniques, as a measure of association for scoring at least one item of the item set.

13. The method of claim 1, wherein the collaborative filtering employs tau measures, smoothed via cutoff smoothing techniques, as a measure of association for scoring at least one item of the item set.

14. The method of claim 1, wherein the collaborative filtering employs tau measures, smoothed via prior on counts smoothing techniques, as a measure of association for scoring at least one item of the item set, the item set comprising a higher-order item set wherein more than one item is represented on a left-hand side of an association rule applicable to at least one item in the item set.

15. The method of claim 1, wherein the collaborative filtering employs tau measures, smoothed via informative priors on measures of association smoothing techniques, as a measure of association for scoring at least one item of the item set.

16. The method of claim 1, wherein the collaborative filtering employs tau measures, smoothed via nonuniform prior smoothing techniques, as a measure of association for scoring at least one item of the item set.

17. The method of claim 1, wherein the collaborative filtering employs Phi, smoothed via cutoff smoothing techniques, as a measure of association for scoring at least one item of the item set.

18. The method of claim 1, wherein the collaborative filtering employs Phi, smoothed via prior on counts smoothing techniques, as a measure of association for scoring at least one item of the item set, the item set comprising a higher-order item set wherein more than one item is represented on a left-hand side of an association rule applicable to at least one item in the item set.

19. The method of claim 1, wherein the collaborative filtering employs Phi, smoothed via informative priors on measures of association smoothing techniques, as a measure of association for scoring at least one item of the item set.

20. The method of claim 1, wherein the collaborative filtering employs Phi, smoothed via nonuniform prior smoothing techniques, as a measure of association for scoring at least one item of the item set; and employing at least one multiple-score collaborative filtering evaluation method to obtain a single score for an item when more than one measure of association score applies to that item.

21. The method of claim 1, wherein the collaborative filtering employs cross-product, smoothed via cutoff smoothing techniques, as a measure of association for scoring at least one item of the item set.

22. The method of claim 1, wherein the collaborative filtering employs cross-product, smoothed via prior on counts smoothing techniques, as a measure of association for scoring at least one item of the item set, the item set comprising a higher-order item set wherein more than one item is represented on a left-hand side of an association rule applicable to at least one item in the item set.

23. The method of claim 1, wherein the collaborative filtering employs cross-product, smoothed via informative priors on measures of association smoothing techniques, as a measure of association for scoring at least one item of the item set.

24. The method of claim 1, wherein the collaborative filtering employs cross-product, smoothed via nonuniform prior smoothing techniques, as a measure of association for scoring at least one item of the item set.

25. The method of claim 1, wherein the collaborative filtering employs log of cross-product, smoothed via cutoff smoothing techniques, as a measure of association for scoring at least one item of the item set.

26. The method of claim 1, wherein the collaborative filtering employs log of cross-product, smoothed via prior on counts smoothing techniques, as a measure of association for scoring at least one item of the item set, the item set comprising a higher-order item set wherein more than one item is represented on a left-hand side of an association rule applicable to at least one item in the item set.

27. The method of claim 1, wherein the collaborative filtering employs log of cross-product, smoothed vi informative priors on measures of association smoothing techniques, as a measure of association for scoring at least one item of the item set.

28. The method of claim 1, wherein the collaborative filtering employs log of cross-product, smoothed via nonuniform prior smoothing techniques, as a measure of association for scoring at least one item of the item set.

29. The method of claim 1, further comprising receiving a higher-order item set wherein more than one item is represented on a left-hand side of an association rule applicable to at least one item in the item set.

30. The method of claim 1, further comprising utilizing a highest value score of scores applicable to an item as the single score of the multiple-score collaborative filtering evaluation method.

31. The method of claim 30, further comprising receiving a higher-order item set wherein more than one item is represented on a left-hand side of an association rule applicable to at least one item in the item set.

32. The method of claim 1, the selected smoother is selected, based on the item set, from among known smoothers.

33. A collaborative filtering system, the system comprising:
a processor;
a memory;
instructions stored in the memory and executed by the processor, the instructions comprising:
a measure of association selection component that selects an appropriate measure of association from among known measures of association, the selection is based on the known measures of association and an item set containing at least one item of input data;
a smoothing component that smoothes at least one item of the item set via a selected smoother;
a measure of association computing component that scores at least one item of the item set by employing the selected measure of association; wherein the measure of association computing component additionally employs at least one multiple-score collaborative filtering evaluation method to obtain a single score for an item when more than one measure of association score applies to that item; and
a filtering component that employs Lift as a measure of association for scoring at least one item of the item set.

34. A kiosk employing the system of claim 33.
35. A search engine employing the system of claim 33.
36. A set-top box employing the system of claim 33.
37. A television guide employing the system of claim 33.
38. A video guide employing the system of claim 33.
39. A media guide employing the system of claim 33.
40. A music guide employing the system of claim 33.
41. A merchandising system employing the system of claim 33.
42. A targeted advertising system employing the system of claim 33.
43. A recommendation system employing the system of claim 33.
44. A commerce server employing the system of claim 33.
45. A computer readable medium having stored thereon computer executable components of the system of claim 33.
46. A device employing the system of claim 33 comprising at least one selected from the group consisting of a computer, a server, and a hand held electronic device.

47. A collaborative filtering system, the system comprising:
a processor;
a memory;
instructions stored in the memory and executed by the processor, the instructions comprising:
a measure of association selection component that selects an appropriate measure of association from among known measures of association, the selection is based on the known measures of association and an item set containing at least one item of input data;
a smoothing component that smoothes at least one item of the item set via a selected smoother;
a measure of association computing component that scores at least one item of the item set by employing the selected measure of association; wherein the measure of association computing component additionally employs at least one multiple-score collaborative filtering evaluation method to obtain a single score for an item when more than one measure of association score applies to that item; and
a filtering component that employs informative priors on a measure of association for smoothing the measure of association utilized in collaborative filtering.

48. A method of data analysis, employing collaborative filtering, implemented as instructions executed by a processor operatively coupled to memory, the method comprising:
receiving an item set containing at least one item of input data;
selecting an appropriate measure of association from among known measures of association, the selection is based on the known measures of association and the item set;
scoring at least one item of the item set by employing the selected measure of association;
selecting at least one additional measure of association based on the item set;
scoring at least one item of the item set by employing the at least one additional measure of association;
smoothing at least one item of the item set via a selected smoother; and
employing at least one multiple-score collaborative filtering evaluation method to obtain a single score for an item when more than one measure of association score applies to that item, wherein Lift is employed as a measure of association in the collaborative filtering.

49. A method of data analysis, employing collaborative filtering, implemented as instructions executed by a processor operatively coupled to memory, the method comprising:
receiving an item set containing at least one item of input data;
selecting an appropriate measure of association from among known measures of association, the selection is based on the known measures of association and the item set;
scoring at least one item of the item set by employing the selected measure of association;
selecting at least one additional measure of association based on the item set;
scoring at least one item of the item set by employing the at least one additional measure of association;
smoothing at least one item of the item set via a selected smoother;
employing at least one multiple-score collaborative filtering evaluation method to obtain a single score for an item when more than one measure of association score applies to that item; and
employing informative priors on a measure of association for smoothing the measure of association utilized in the collaborative filtering.

50. A data analysis system employing collaborative filtering, the system comprising:
means for receiving an item set containing at least one item of input data;
means for selecting, based on the item set, an appropriate measure of association from among known measures of association;
means for scoring at least one item of the item set by employing the selected measure of association;

means for selecting at least one additional measure of association based on the item set;

means for scoring at least one item of the item set by employing the at least one additional measure of association;

means for smoothing at least one item of the item set via a selected smoother; and means for employing at least one multiple-score collaborative filtering evaluation method to obtain a single score for an item when more than one measure of association score applies to that item, the collaborative filtering based, at least in part, on employing Lift as a measure of association.

51. A device employing the method of claim 48 comprising at least one selected from the group consisting of a computer, a server, and a hand held electronic device.

52. A computer readable medium having stored thereon computer executable instructions for performing the method of claim 48.

53. A collaborative filtering system embodied on a computer readable medium, comprising:

means for receiving an item set containing at least one item of input data;

means for selecting, based on the item set, an appropriate measure of association from among known measures of association;

means for scoring at least one item of the item set by employing the selected measure of association;

means for selecting at least one additional measure of association based on the item set;

means for scoring at least one item of the item set by employing the at least one additional measure of association;

means for smoothing at least one item of the item set via a selected smoother; and means for employing at least one multiple-score collaborative filtering evaluation method to obtain a single score for an item when more than one measure of association score applies to that item.

54. A collaborative filtering system embodied on a computer readable medium, comprising:

a measure of association selection component that selects an appropriate measure of association from among known measures of association, the selection is based on the known measures of association and an item set containing at least one item of input data;

a smoothing component that smoothes at least one item of the item set via a selected smoother; and a measure of association computing component that scores at least one item of the item set by employing the selected measure of association; wherein the measure of association computing component additionally employs at least one multiple-score collaborative filtering evaluation method to obtain a single score for an item when more than one measure of association score applies to that item.

55. The system of claim 54, the item set comprising a higher-order item set wherein more than one item is represented on a left-hand side of an association rule applicable to at least one item in the item set.

56. The system of claim 54, the multiple-score collaborative filtering evaluation method utilizing a highest value score of scores applicable to an item as the single score.

57. The system of claim 56, the item set comprising a higher-order item set wherein more than one item is represented on a left-hand side of an association rule applicable to at least one item in the item set.

58. The system of claim 54, further comprising:
a filtering component that employs Lift, smoothed via prior on counts smoothing techniques.

59. The system of claim 58, the item set comprising a higher-order item set wherein more than one item is represented on a left-hand side of an association rule applicable to at least one item in the item set.

60. The system of claim 58, the multiple-score collaborative filtering evaluation method comprising utilizing a highest value score of scores applicable to an item as the single score.

61. The system of claim 60, the item set comprising a higher-order item set wherein more than one item is represented on a left-hand side of an association rule applicable to at least one item in the item set.

62. The system of claim 54, further comprising:
a filtering component that employs Lift, smoothed via informative priors on measures of association smoothing techniques.

63. The system of claim 62, the item set comprising a higher-order item set wherein more than one item is represented on a left-hand side of an association rule applicable to at least one item in the item set.

64. The system of claim 62, the multiple-score collaborative filtering evaluation method comprising utilizing a highest value score of scores applicable to an item as the single score.

65. The system of claim 64, the item set comprising a higher-order item set wherein more than one item is represented on a left-hand side of an association rule applicable to at least one item in the item set.

66. The system of claim 54, further comprising:
a filtering component that employs Lift, smoothed via non-uniform prior smoothing techniques.

67. The system of claim 66, the item set comprising a higher-order item set wherein more than one item is represented on a left-hand side of an association rule applicable to at least one item in the item set.

68. The system of claim 66, the multiple-score collaborative filtering evaluation method comprising utilizing a highest value score of scores applicable to an item as the single score.

69. The system of claim 68, the item set comprising a higher-order item set wherein more than one item is represented on a left-hand side of an association rule applicable to at least one item in the item set.

70. The system of claim 54, further comprising:
a filtering component that employs Weight of Evidence, smoothed via cutoff smoothing techniques.

71. The system of claim 70, the item set comprising a higher-order item set wherein more than one item is represented on a left-hand side of an association rule applicable to at least one item in the item set.

72. The system of claim 70, the multiple-score collaborative filtering evaluation method comprising utilizing a highest value score of scores applicable to an item as the single score.

73. The system of claim 72, the item set comprising a higher-order item set wherein more than one item is represented on a left-hand side of an association rule applicable to at least one item in the item set.

74. The system of claim 54, further comprising:
a filtering component that employs Weight of Evidence, smoothed via prior on counts smoothing techniques, the item set comprising a higher-order item set wherein more than one item is represented on a left-hand side of an association rule applicable to at least one item in the item set.

75. The system of claim 74, the multiple-score collaborative filtering evaluation method comprising utilizing a highest value score of scores applicable to an item as the single score.

76. The system of claim 54, further comprising:
a filtering component that employs Weight of Evidence, smoothed via informative priors on measures of association smoothing techniques.

77. The system of claim 76, the item set comprising a higher-order item set wherein more than one item is represented on a left-hand side of an association rule applicable to at least one item in the item set.

78. The system of claim 76, the multiple-score collaborative filtering evaluation method comprising utilizing a highest value score of scores applicable to an item as the single score.

79. The system of claim 78, the item set comprising a higher-order item set wherein more than one item is represented on a left-hand side of an association rule applicable to at least one item in the item set.

80. The system of claim 54, further comprising:
a filtering component that employs Weight of Evidence, smoothed via nonuniform prior smoothing techniques.

81. The system of claim 80, the item set comprising a higher-order item set wherein more than one item is represented on a left-hand side of an association rule applicable to at least one item in the item set.

82. The system of claim 80, the multiple-score collaborative filtering evaluation method comprising utilizing a highest value score of scores applicable to an item as the single score.

83. The system of claim 82, the item set comprising a higher-order item set wherein more than one item is represented on a left-hand side of an association rule applicable to at least one item in the item set.

84. The system of claim 54, further comprising:
a filtering component that employs Yule's Q, smoothed via cutoff smoothing techniques.

85. The system of claim 84, the item set comprising a higher-order item set wherein more than one item is represented on a left-hand side of an association rule applicable to at least one item in the item set.

86. The system of claim 84, the multiple-score collaborative filtering evaluation method comprising utilizing a highest value score of scores applicable to an item as the single score.

87. The system of claim 86, the item set comprising a higher-order item set wherein more than one item is represented on a left-hand side of an association rule applicable to at least one item in the item set.

88. The system of claim 54, further comprising:
a filtering component that employs Yule's Q, smoothed via prior on counts smoothing techniques.

89. The system of claim 88, the multiple-score collaborative filtering evaluation method comprising utilizing a highest value score of scores applicable to an item as the single score.

90. The system of claim 54, further comprising:
a filtering component that employs Yule's Q, smoothed via informative priors on measures of association smoothing techniques.

91. The system of claim 90, the item set comprising a higher-order item set wherein more than one item is represented on a left-hand side of an association rule applicable to at least one item in the item set.

92. The system of claim 90, the multiple-score collaborative filtering evaluation method comprising utilizing a highest value score of scores applicable to an item as the single score.

93. The system of claim 92, the item set comprising a higher-order item set wherein more than one item is represented on a left-hand side of an association rule applicable to at least one item in the item set.

94. The system of claim 54, further comprising:
a filtering component that employs Yule's Q, smoothed via nonuniform prior smoothing techniques.

95. The system of claim 94, the item set comprising a higher-order item set wherein more than one item is represented on a left-hand side of an association rule applicable to at least one item in the item set.

96. The system of claim 94, the multiple-score collaborative filtering evaluation method comprising utilizing a highest value score of scores applicable to an item as the single score.

97. The system of claim 96, the item set comprising a higher-order item set wherein more than one item is represented on a left-hand side of an association rule applicable to at least one item in the item set.

98. The system of claim 54, further comprising:
a filtering component that employs tau measures, smoothed via cutoff smoothing techniques.

99. The system of claim 98, the item set comprising a higher-order item set wherein more than one item is represented on a left-hand side of an association rule applicable to at least one item in the item set.

100. The system of claim 98, the multiple-score collaborative filtering evaluation method comprising utilizing a highest value score of scores applicable to an item as the single score.

101. The system of claim 100, the item set comprising a higher-order item set wherein more than one item is represented on a left-hand side of an association rule applicable to at least one item in the item set.

102. The system of claim 54, further comprising:
a filtering component that employs tau measures, smoothed via prior on counts smoothing techniques.

103. The system of claim 102, the multiple-score collaborative filtering evaluation method comprising utilizing a highest value score of scores applicable to an item as the single score.

104. The system of claim 54, further comprising:
a filtering component that employs tau measures, smoothed via informative priors on measures of association smoothing techniques.

105. The system of claim 104, the item set comprising a higher-order item set wherein more than one item is represented on a left-hand side of an association rule applicable to at least one item in the item set.

106. The system of claim 104, the multiple-score collaborative filtering evaluation method comprising utilizing a highest value score of scores applicable to an item as the single score.

107. The system of claim 106, the item set comprising a higher-order item set wherein more than one item is represented on a left-hand side of an association rule applicable to at least one item in the item set.

108. The system of claim 54, further comprising:
a filtering component that employs tau measures, smoothed via nonuniform prior smoothing techniques.

109. The system of claim 108, the item set comprising a higher-order item set wherein more than one item is represented on a left-hand side of an association rule applicable to at least one item in the item set.

110. The system of claim 108, the multiple-score collaborative filtering evaluation method comprising utilizing a highest value score of scores applicable to an item as the single score.

111. The system of claim 110, the item set comprising a higher-order item set wherein more than one item is represented on a left-hand side of an association rule applicable to at least one item in the item set.

112. The system of claim 54, further comprising:
a filtering component that employs Phi, smoothed via cutoff smoothing techniques.

113. The system of claim 112, the item set comprising a higher-order item set wherein more than one item is represented on a left-hand side of an association rule applicable to at least one item in the item set.

114. The system of claim 112, the multiple-score collaborative filtering evaluation method comprising utilizing a highest value score of scores applicable to an item as the single score.

115. The system of claim 114, the item set comprising a higher-order item set wherein more than one item is represented on a left-hand side of an association rule applicable to at least one item in the item set.

116. The system of claim 54, further comprising:
a filtering component that employs Phi, smoothed via prior on counts smoothing techniques, wherein more than one item is represented on a left-hand side of an association rule applicable to at least one item in the item set.

117. The system of claim 116, the multiple-score collaborative filtering evaluation method comprising utilizing a highest value score of scores applicable to an item as the single score.

118. The system of claim 54, further comprising:
a filtering component that employs Phi, smoothed via informative priors on measures of association smoothing techniques.

119. The system of claim 118, the item set comprising a higher-order item set wherein more than one item is represented on a left-hand side of an association rule applicable to at least one item in the item set.

120. The system of claim 118, the multiple-score collaborative filtering evaluation method comprising utilizing a highest value score of scores applicable to an item as the single score.

121. The system of claim 120, the item set comprising a higher-order item set wherein more than one item is represented on a left-hand side of an association rule applicable to at least one item in the item set.

122. The system of claim 54, further comprising:
a filtering component that employs Phi, smoothed via nonuniform prior smoothing techniques.

123. The system of claim 122, the item set comprising a higher-order item set wherein more than one item is represented on a left-hand side of an association rule applicable to at least one item in the item set.

124. The system of claim 122, the multiple-score collaborative filtering evaluation method comprising utilizing a highest value score of scores applicable to an item as the single score.

125. The system of claim 124, the item set comprising a higher-order item set wherein more than one item is represented on a left-hand side of an association rule applicable to at least one item in the item set.

126. The system of claim 54, further comprising:
a filtering component that employs cross-product, smoothed via cutoff smoothing techniques.

127. The system of claim 126, the item set comprising a higher-order item set wherein more than one item is represented on a left-hand side of an association rule applicable to at least one item in the item set.

128. The system of claim 126, the multiple-score collaborative filtering evaluation method comprising utilizing a highest value score of scores applicable to an item as the single score.

129. The system of claim 128, the item set comprising a higher-order item set wherein more than one item is represented on a left-hand side of an association rule applicable to at least one item in the item set.

130. The system of claim 54, further comprising:
a filtering component that employs cross-product, smoothed via prior on counts smoothing techniques, wherein more than one item is represented on a left-hand side of an association rule applicable to at least one item in the item set.

131. The system of claim 130, the multiple-score collaborative filtering evaluation method comprising utilizing a highest value score of scores applicable to an item as the single score.

132. The system of claim 54, further comprising:
a filtering component that employs cross-product, smoothed via informative priors on measures of association smoothing techniques.

133. The system of claim 132, the item set comprising a higher-order item set wherein more than one item is represented on a left-hand side of an association rule applicable to at least one item in the item set.

134. The system of claim 132, the multiple-score collaborative filtering evaluation method comprising utilizing a highest value score of scores applicable to an item as the single score.

135. The system of claim 134, the item set comprising a higher-order item set wherein more than one item is represented on a left-hand side of an association rule applicable to at least one item in the item set.

136. The system of claim 54, further comprising:
a filtering component that employs cross-product, smoothed via nonuniform prior smoothing techniques.

137. The system of claim 136, the item set comprising a higher-order item set wherein more than one item is represented on a left-hand side of an association rule applicable to at least one item in the item set.

138. The system of claim 136, the multiple-score collaborative filtering evaluation method comprising utilizing a highest value score of scores applicable to an item as the single score.

139. The system of claim 138, the item set comprising a higher-order item set wherein more than one item is represented on a left-hand side of an association rule applicable to at least one item in the item set.

140. The system of claim 54, further comprising:
a filtering component that employs log of cross-product, smoothed via cutoff smoothing techniques.

141. The system of claim 140, the item set comprising a higher-order item set wherein more than one item is represented on a left-hand side of an association rule applicable to at least one item in the item set.

142. The system of the claim 140, the multi-score collaborative filtering evaluation method comprising utilizing a highest value score of scores applicable to an item as the single score.

143. The system of claim 142, the item set comprising a higher-order item set wherein more than one item is represented on a left-hand side of an association rule applicable to at least one item in the item set.

144. The system of claim 54, further comprising:
a filtering component that employs log of cross-product, smoothed via prior on counts smoothing techniques, wherein more than one item is represented on a left-hand side of an association rule applicable to at least one item in the item set.

145. The system of claim 144, the multiple-score collaborative filtering evaluation method comprising utilizing a highest value score of scores applicable to an item as the single score.

146. The system of claim 54, further comprising:
a filtering component that employs log of cross-product, smoothed via informative priors on measures of association smoothing techniques.

147. The system of claim 146, the item set comprising a higher-order item set wherein more than one item is represented on a left-hand side of an association rule applicable to at least one item in the item set.

148. The system of claim 146, the multiple-score collaborative filtering evaluation method comprising utilizing a highest value score of scores applicable to an item as the single score.

149. The system of claim 148, the item set comprising a higher-order item set wherein more than one item is represented on a left-hand side of an association rule applicable to at least one item in the item set.

150. The system of claim 54, further comprising:
a filtering component that employs log of cross-product, smoothed via nonuniform prior smoothing techniques.

151. The system of claim 150, the item set comprising a higher-order item set wherein more than one item is represented on a left-hand side of an association rule applicable to at least one item in the item set.

152. The system of claim 150, the multiple-score collaborative filtering evaluation method comprising utilizing a highest value score of scores applicable to an item as the single score.

153. The system of claim 152, the item set comprising a higher-order item set wherein more than one item is represented on a left-hand side of an association rule applicable to at least one item in the item set.

154. The system of claim 54, the smoothing component selects, based on the item set, the selected smoother from among known smoothers.

155. The system of claim 54, the measure of association selection component selects at least one additional measure of association based on the item set, and a filtering component scores at least one item of the item set by employing the at least one additional measure of association.

* * * * *